BEST AVAILABLE COPY

T858,024

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED JANUARY 21, 1969

858 O.G. 725

767,043

CURTAIN COATING METHOD FOR PACKAGING AN ARTICLE

John L. Cameron, P.O. Box 431, Kingsport, Tenn. 37662

Continuation of application Ser. No. 531,274, Mar. 2, 1966. This application Sept. 24, 1968. Published Jan. 21, 1969

Class 264—90

3 Sheets Drawing. 13 Pages Specification

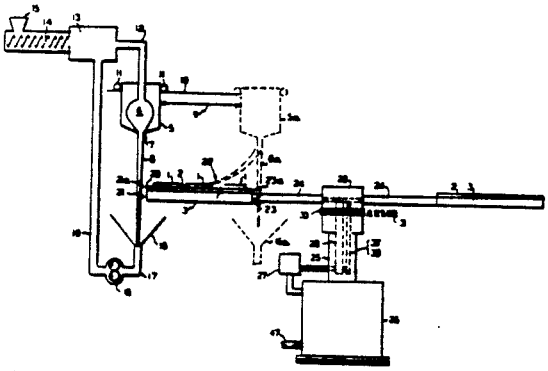

Figure 1:
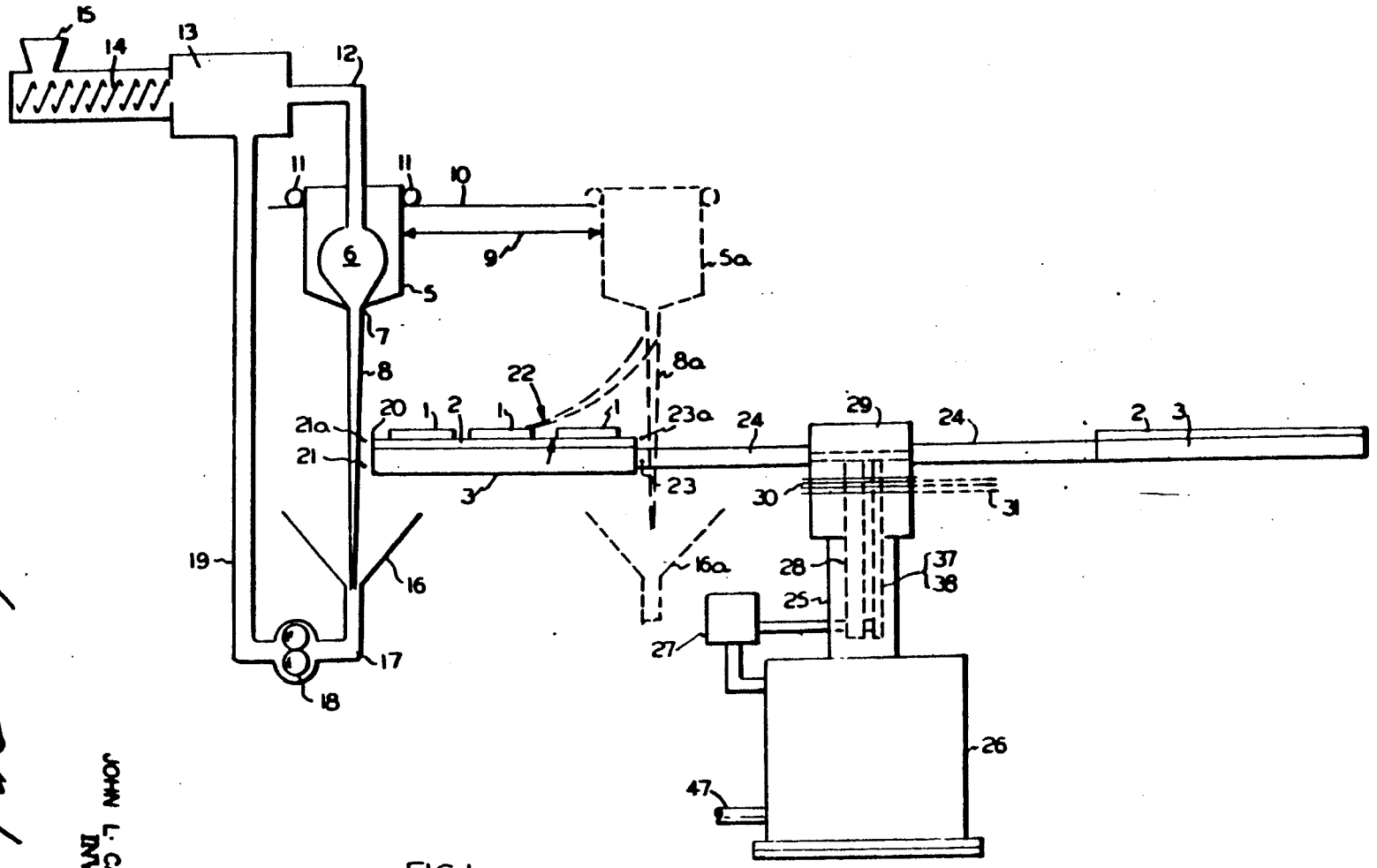
Figure 2:
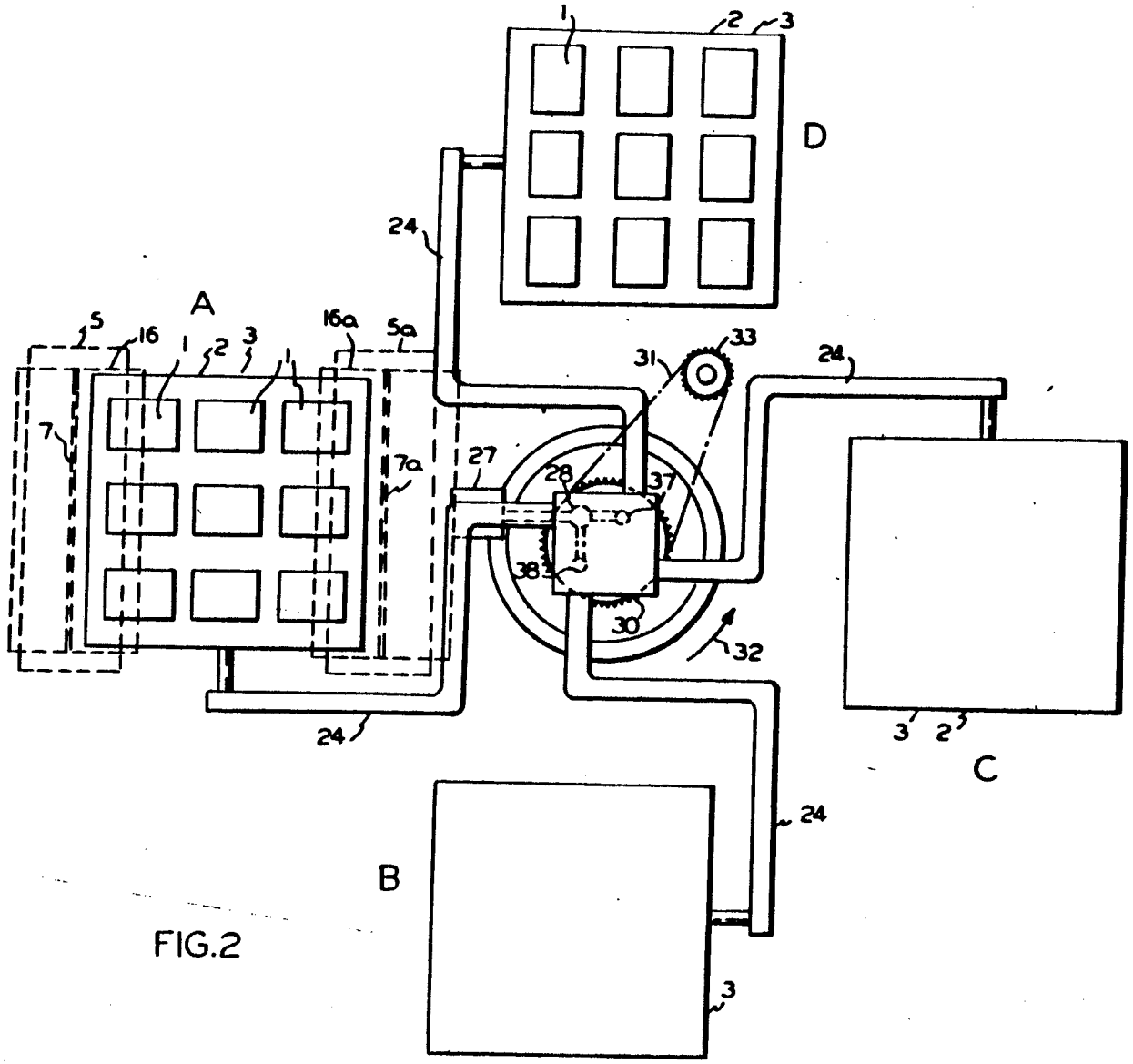
Figure 3:
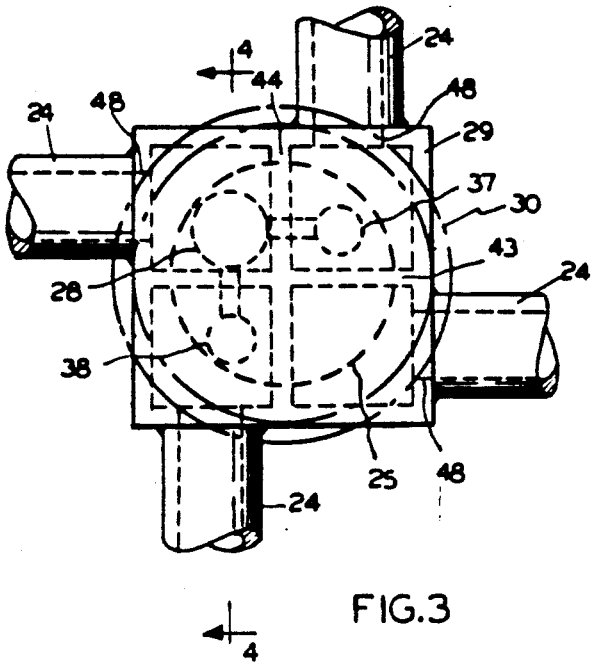
Figure 4:
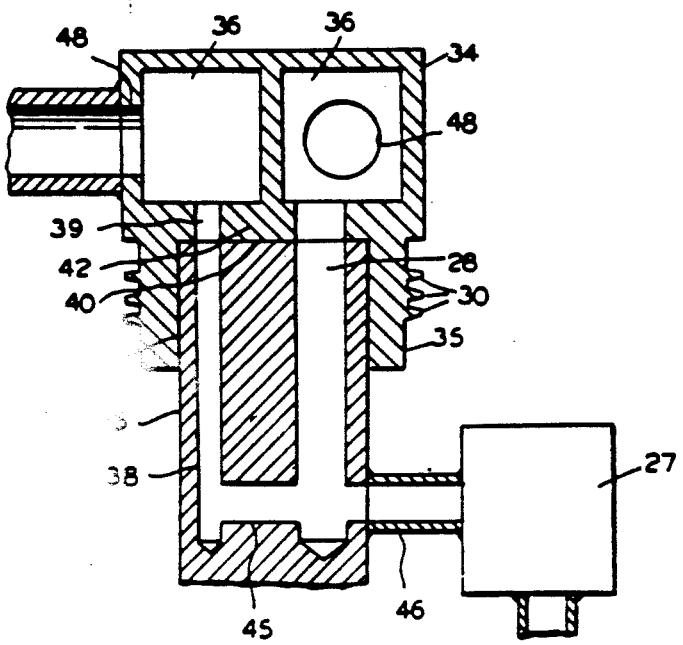

Apparatus for coating an article, as illustrated in FIGURE 1, including a plurality of receiving elements for supporting an article to be coated extending radially outward from a central support column. The receiving elements can be indexed around the support column to any of several stations one of which includes a movable nozzle for extruding a curtain of molten material onto the article. A vacuum is created beneath the article to hold it in place during indexing and to draw the molten curtain into secure contact with the article during coating. The method of utilizing this apparatus includes the steps of (a) placing the article to be coated on one of the receiving elements, (b) reducing the air pressure beneath the substrate to hold the article in place, (c) indexing the article into a coating station, (d) moving a curtain of molten thermoplastic across the article, (e) indexing the coated article away from the coating station and (f) removing the coated article from the receiving element.

T858024

BEST AVAILABLE COPY

JOHN L. CAMERON
INVENTOR

BY Walter D. Patterson
Charles L. Ford ATTORNEYS

T858024

BEST AVAILABLE COPY

JOHN L. CAMERON
INVENTOR

BY Walter O. Hodsdon
Charles L. Gold ATTORNEYS

T 858024

BEST AVAILABLE COPY

JOHN L. CAMERON
INVENTOR

BY Walter O. Hodsdon
Edward L. Foul ATTORNEYS